US007783059B2

(12) United States Patent
Yamasaki et al.

(10) Patent No.: US 7,783,059 B2
(45) Date of Patent: Aug. 24, 2010

(54) ACOUSTIC DEVICE

(75) Inventors: Kuniko Yamasaki, Tokyo (JP);
Yoshihide Koyama, Tokyo (JP)

(73) Assignee: Clarion Co., Ltd., Tokyo (JP)

(*) Notice: Subject to any disclaimer, the term of this patent is extended or adjusted under 35 U.S.C. 154(b) by 1160 days.

(21) Appl. No.: 10/669,802

(22) Filed: Sep. 25, 2003

(65) Prior Publication Data
US 2004/0125694 A1    Jul. 1, 2004

(30) Foreign Application Priority Data
Sep. 26, 2002  (JP)  .......................... P2002-281202

(51) Int. Cl.
*H03G 3/00*  (2006.01)
*H04B 1/00*  (2006.01)
*H04S 7/00*  (2006.01)
*H04R 5/02*  (2006.01)

(52) U.S. Cl. .......................... 381/86; 381/123; 381/104; 381/307; 369/2

(58) Field of Classification Search ............. 340/426.34, 340/568.1; 381/386, 389, 300, 302, 86; 181/144; 715/714, 717, 718; 455/344–346, 352
See application file for complete search history.

(56) References Cited

U.S. PATENT DOCUMENTS

| 5,108,335 | A |   | 4/1992  | Carey et al.            |
|-----------|---|---|---------|-------------------------|
| 5,910,996 | A | * | 6/1999  | Eggers et al. ... 381/107|
| 6,321,278 | B1| * | 11/2001 | Phu et al. ......... 710/14 |
| 6,567,655 | B1| * | 5/2003  | Wietzke et al. ... 455/345|

| 2002/0076066 | A1 | * | 6/2002 | Yabe et al. ............. 381/104 |
| 2002/0131605 | A1 | * | 9/2002 | Vilkinofsky et al. ...... 381/86 |
| 2003/0053638 | A1 | * | 3/2003 | Yasuhara ................. 381/86 |

FOREIGN PATENT DOCUMENTS

| JP | 60-084022  | 5/1985  |
| JP | 60-101845  | 6/1985  |
| JP | 07-192442  | 7/1995  |
| JP | 9-091872   | 4/1997  |
| JP | 9-320251   | 12/1997 |
| JP | 11-170922  | 6/1999  |
| JP | 2000-21144 | 1/2000  |

OTHER PUBLICATIONS

Notification of Reasons for Rejection dated Nov. 9, 2004 with English translation.

* cited by examiner

*Primary Examiner*—Wayne R Young
*Assistant Examiner*—Dionne H Pendleton
(74) *Attorney, Agent, or Firm*—McGinn IP Law Group PLLC

(57) ABSTRACT

A body device includes: a plurality of sound sources; a speaker and a headphone for outputting sound signals from those sound sources; and a mode setting unit capable of setting a single mode, in which the sound signals from one sound source are output in response to an operation from a front operation unit, and a dual mode in which, while the sound signals from one sound source are being output from the speaker, the voice signals from another sound source are output from the headphone; an external connection unit for connecting an external DVD device with the outside; and a control unit for controlling a mode setting unit so that the body device may be turned ON in the dual mode when a power ON demand signal from the external DVD device or a rear operation unit is detected.

13 Claims, 5 Drawing Sheets

ACOUSTIC DEVICE

BACKGROUND OF THE INVENTION

1. Field of the Invention

The present invention relates to an acoustic device such as an audio device, which includes a plurality of sound sources of a CD, an MD, a radio and so on, and a speaker and a headphone for outputting sound based on sound signals from the individual sound sources and which is provided with a function such as a dual media function to output the sound based on the sound signals from the different sound sources simultaneously from both the speaker and the headphone.

2. Description of the Related Art

In recent years, the audio device having such dual media function is applied to a vehicular audio system.

FIG. 5 is a system construction diagram showing the entire construction of the vehicular audio system having a general dual media function.

The vehicular audio system 100, as shown in FIG. 5, includes: a body device 101 arranged on the front side in a vehicular compartment and having a plurality of functions of sound sources such as CD or radio; a front operation unit 102 for operating the body device 101 on the front side; a rear operation unit 103 for operating the body device 101 remotely on the rear side in the compartment; and a speaker 104 and a headphone 105 for outputting sound based on sound signals coming from the sound source functions of the body device 101.

The speaker 104 is composed of two front speakers 104A arranged on the front side, and two rear speakers 104B arranged on the rear side. On the other hand, the headphone 105 is arranged on the rear side.

Here, the front operation unit 102 corresponds to the front panel as arranged on the front side of the body device 101, and the rear operation unit 103 corresponds to the remote operation unit arranged on the rear side.

The body device 101 has a dual media function and can be switched and set to a single mode or a dual mode in response to a predetermined operation from the front operation unit 102.

In the single mode, the sound based on the sound signals from one of the sound sources are output exclusively from the speaker 104.

In the dual mode, the sound based on the sound signals from one of the sound sources are output from the speaker 104, whereas the sound based on the sound signals from another sound source are output from the headphone 105.

In case the body device 101 is demanded for provisions of different sound sources such that a passenger on the front side requests the radio whereas a passenger on the rear side requests the CD, the dual mode can be set by operating the front operation unit 102 in a predetermined manner. Then, the sound based on the sound signals from the radio requested by the front passenger can be output from the speaker 104, and the sound based on the sound signals from the CD requested by the rear passenger can be output from the headphone 105.

In short, the front passenger and the rear passenger can accept the sound signals from the different sound sources through the speaker 104 and the headphone 105.

According to the vehicular audio system 100 having such dual media function, the dual mode can be set in response to the predetermined operation of the front operation unit 102. In the duel mode thus set, the different sound sources can be provided through the speaker 104 and the headphone 105. Therefore, the front and rear passengers can accept the individual provisions of the sound signals from the different sound sources through the speaker 104 and the headphone 105.

According to the vehicular audio system 100 having the aforementioned dual media function, however, in case the rear passenger requests the provision of the sound source different from that of the front passenger while the power source of the body device 101 is OFF, the rear passenger can turn ON the power source of the body device 101 with the rear operation unit 103 but not in the dual mode. Therefore, the rear passenger has to ask the front passenger to set the dual mode through the front operation unit 102 so that the front passenger is burdened with the setting operations.

SUMMARY OF THE INVENTION

The invention has been conceived in view of the aforementioned points and has an object to provide an acoustic device, which can turn ON the power source in the dual mode by a remote operation even while the power source is off.

In order to achieve the aforementioned object, according to a first aspect of the invention, there is provided an acoustic device including: a plurality of sound sources; a first output unit and a second output unit for outputting sound based on sound signals from the sound sources; and a mode setting unit responding to a predetermined operation for switching and setting a first mode, in which the sound signals from one of the sound based on the sound sources are output from the first output unit, and a second mode, in which while the sound signals from one of the sound based on the sound source are being output from the first output unit, the sound based on the sound signals from another sound source are output from the second output unit, wherein the improvement includes: a remote operation unit for operating the acoustic device remotely; and a control unit for controlling the mode setting unit so that the power source of the acoustic device may be turned ON in the second mode, when it detects a power ON demand signal from the remote operation unit while the power source is OFF.

According to the first aspect of the invention, therefore, when the power ON demand signal from the remote operation unit is detected while the power source of the acoustic device is OFF, the power source is turned ON in the second mode such as the dual mode. Even from the remote operation unit arranged on the rear side in the compartment, therefore, the power source can be turned ON in the dual mode without burdening the operations of the front passenger.

According to a second aspect of the invention, there is provided an acoustic device including: a plurality of sound sources; a first output unit and a second output unit for outputting sound based on sound signals from the sound sources; and a mode setting unit responding to a predetermined operation for switching and setting a first mode, in which the sound signals from one of the sound based on the sound sources are output from the first output unit, and a second mode, in which while the sound based on the sound signals from one of the sound source are being output from the first output unit, the sound based on the sound signals from another sound source are output from the second output unit, wherein the improvement includes: an external connection unit for externally connecting an electronic device; and a control unit for controlling the mode setting unit so that the power source of the acoustic device may be turned ON in the second mode, when it detects a power ON demand signal from the electronic device through the external connection unit while the power source is OFF.

According to the second aspect of the invention, therefore, when the electronic device is connected with the outside so that the power ON demand signal from the electronic device while the power source of the acoustic device is OFF, the power source is turned ON in the second mode such as the dual mode. In the case of the connection with the electronic device arranged on the rear side in the compartment, therefore, the power source can be turned ON in the dual mode even from that electronic device arranged on the rear side, without burdening the operations of the front passenger.

BRIEF DESCRIPTION OF THE DRAWINGS

The above objects and advantages of the present invention will become more apparent by describing preferred exemplary embodiment thereof in detail with reference to the accompanying drawings, wherein.

DETAILED DESCRIPTION OF THE PREFERRED EMBODIMENTS

Figure 1:
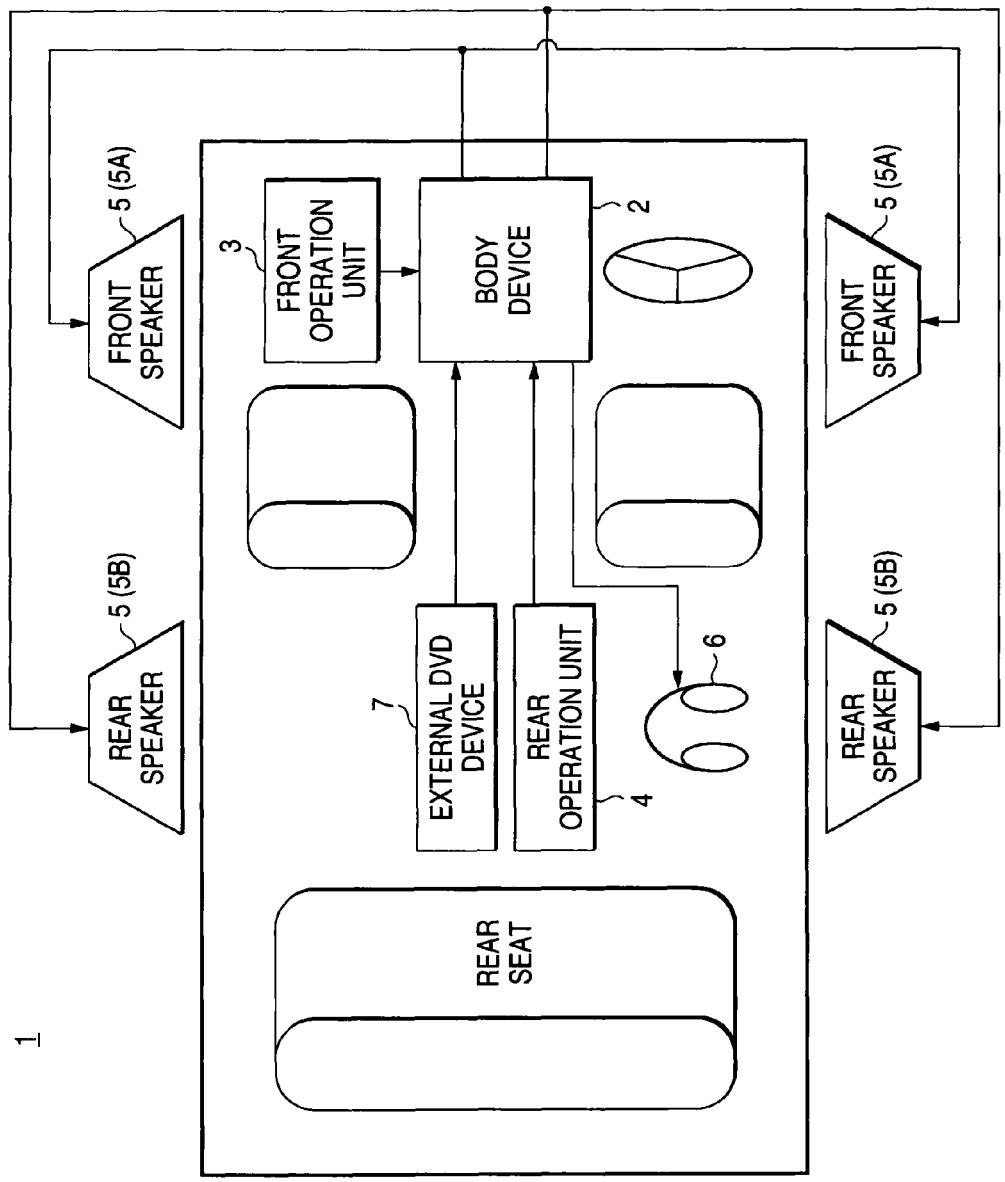
FIG. 1 is a system construction diagram showing the entire construction of a vehicular audio system according to an embodiment of an acoustic device of the invention.

Hereinafter, prior to describing preferred embodiments of the invention, various aspects of the invention will be described.

According to a first aspect of the invention, there is provided an acoustic device including: a plurality of sound sources; a first output unit and a second output unit for outputting sound based on sound signals from the sound sources; and a mode setting unit responding to a predetermined operation for switching and setting a first mode, in which the sound signals from one of the sound based on the sound sources are output from the first output unit, and a second mode, in which while the sound signals from one of the sound based on the sound source are being output from the first output unit, the sound based on the sound signals from another sound source are output from the second output unit, wherein the improvement includes: a remote operation unit for operating the acoustic device remotely; and a control unit for controlling the mode setting unit so that the power source of the acoustic device may be turned ON in the second mode, when it detects a power ON demand signal from the remote operation unit while the power source is OFF.

According to the first aspect of the invention, therefore, when the power ON demand signal from the remote operation unit is detected while the power source of the acoustic device is OFF, the power source is turned ON in the second mode such as the dual mode. Even from the remote operation unit arranged on the rear side in the compartment, therefore, the power source can be turned ON in the dual mode without burdening the operations of the front passenger.

According to a third aspect of the invention, in addition to the first aspect of the invention, the acoustic device further including an external connection unit for externally connecting an electronic device having the remote operation unit, and the control unit includes a control unit for controlling the mode setting unit so that the power source of the acoustic device may be turned ON in the second mode, when it detects the power ON demand signal from the remote operation unit through the external connection unit while the power source is OFF.

According to the third aspect of the invention, therefore, when the power ON demand signal from the remote operation unit of an electronic device connected with the outside is detected while the power source of the acoustic device of the invention is OFF, the power source is turned ON in the second mode. In the case of the connection with the electronic device arranged on the rear side in the compartment, therefore, the power source can be turned ON in the dual mode even from that electronic device arranged on the rear side, without burdening the operations of the front passenger.

According to a second aspect of the invention, there is provided an acoustic device including: a plurality of sound sources; a first output unit and a second output unit for outputting sound based on sound signals from the sound sources; and a mode setting unit responding to a predetermined operation for switching and setting a first mode, in which the sound signals from one of the sound based on the sound sources are output from the first output unit, and a second mode, in which while the sound based on the sound signals from one of the sound source are being output from the first output unit, the sound based on the sound signals from another sound source are output from the second output unit, wherein the improvement includes: an external connection unit for externally connecting an electronic device; and a control unit for controlling the mode setting unit so that the power source of the acoustic device may be turned ON in the second mode, when it detects a power ON demand signal from the electronic device through the external connection unit while the power source is OFF.

According to the second aspect of the invention, therefore, when the electronic device is connected with the outside so that the power ON demand signal from the electronic device while the power source of the acoustic device is OFF, the power source is turned ON in the second mode such as the dual mode. In the case of the connection with the electronic device arranged on the rear side in the compartment, therefore, the power source can be turned ON in the dual mode even from that electronic device arranged on the rear side, without burdening the operations of the front passenger.

According to a fourth aspect of the invention, in addition to the second and the third aspect of the invention, the power ON demand signal obtained through the external connection unit is output from the electronic device in response to the power ON of the electronic device.

According to the fourth aspect of the invention, therefore, the signal to be output from the electronic device in response to the power ON of the electronic device is used as the power ON demand signal. In response to the power ON of the electronic device arranged on the rear side, therefore, the power source of the acoustic device can be turned ON in the dual mode without burdening the operations of the front passenger.

According to a fifth aspect of the invention, in addition to the second and the third aspect of the invention, the power ON demand signal obtained through the external connection unit is output from the electronic device in response to the insertion of a recording medium into the electronic device.

According to the fifth aspect of the invention, therefore, the signal to be output from the electronic device in response to the insertion of a recording medium such as a play-back disk into the electronic device is used as the power ON demand signal. In response to the insertion of the recording medium into the electronic device arranged on the rear side, therefore, the power source of the acoustic device can be turned ON in the dual mode without burdening the operations of the front passenger.

According to a sixth aspect of the invention, in addition to the first to the fifth aspect of the invention, the control unit sets the sound output of the first output unit in an interrupted state when the power source of the acoustic device is turned ON in the second mode while the power source is OFF According to the sixth aspect of the invention, therefore, when the power source of the acoustic device is turned ON in the second mode such as the dual mode while it is OFF, the sound outputs of the first output unit such as the speakers are interrupted. Even when the rear passenger turns ON the power source in the dual mode, therefore, it is possible to reliably prevent the situation, in which the front passenger might otherwise be threatened by a sudden speaker output.

According to a seventh aspect of the invention, in addition to the first to the sixth aspect of the invention, the control unit causes a display unit to display power ON information indicating that the power source is turned ON, when the power source of the acoustic device is turned ON in the second mode while the power source is OFF.

According to the seventh aspect of the invention, therefore, when the power source of the acoustic device of the invention is turned ON in the second mode such as the dual mode while it is OFF, there is displayed in the display unit the power ON information indicating that the power source is turned ON. Even when the rear passenger turns ON the power source in the dual mode, therefore, the front passenger can recognize it visually on the basis of the displayed contents of the display unit that the power source is ON.

According to a eighth aspect of the invention, in addition to the seventh aspect of the invention, the acoustic device further including: a last information storage unit for storing, when the power source of the acoustic device is turned OFF, the sound source information relating to the sound source of the sound based on the sound signals being output by the first output unit just before the OFF of the power source, as last sound source information, wherein the control unit causes the display unit to display the last sound source information stored in the last information storage unit, as the power ON information, when the power source is turned ON in the second mode while the power source is OFF.

According to the eighth of the invention, therefore, when the power source of the acoustic device of the invention is turned ON in the second mode such as the dual mode while it is OFF, the last sound source information being stored in the last information storage unit is displayed as the power ON information in the display unit. Even when the rear passenger turns ON the power source in the dual mode, therefore, the front passenger can recognize it visually on the basis of the displayed contents of the display unit that the power source is ON.

With reference to the accompanying drawings, here will be described a vehicular audio system having dual media functions according to an embodiment of the invention. FIG. 1 is a system construction diagram showing the entire construction of a vehicular audio system according to the embodiment.

The vehicular audio system 1, as shown in FIG. 1, includes: a body device 2 arranged on the front side in a vehicular compartment and having a plurality of functions of sound sources such as CD or radio; a front operation unit 3 for operating the body device 2 on the front side; a rear operation unit 4 for operating the body device 2 remotely on the rear side in the compartment; and a speaker 5 and a headphone 6 for outputting sound based on sound signals coming from the sound source functions of the body device 2.

The vehicular audio system 1 further includes an electronic device such as an external DVD device 7 connected from the outside with the body device 2.

The speaker 5 is composed of two front speakers 5A arranged on the front side, and two rear speakers 5B arranged on the rear side. On the other hand, the headphone 6 is arranged on the rear side.

Here, the front operation unit 3 corresponds to the front panel, as arranged on the front side, of the body device 2, and the rear operation unit 4 corresponds to the remote operation unit arranged on the rear side.

Figure 2:
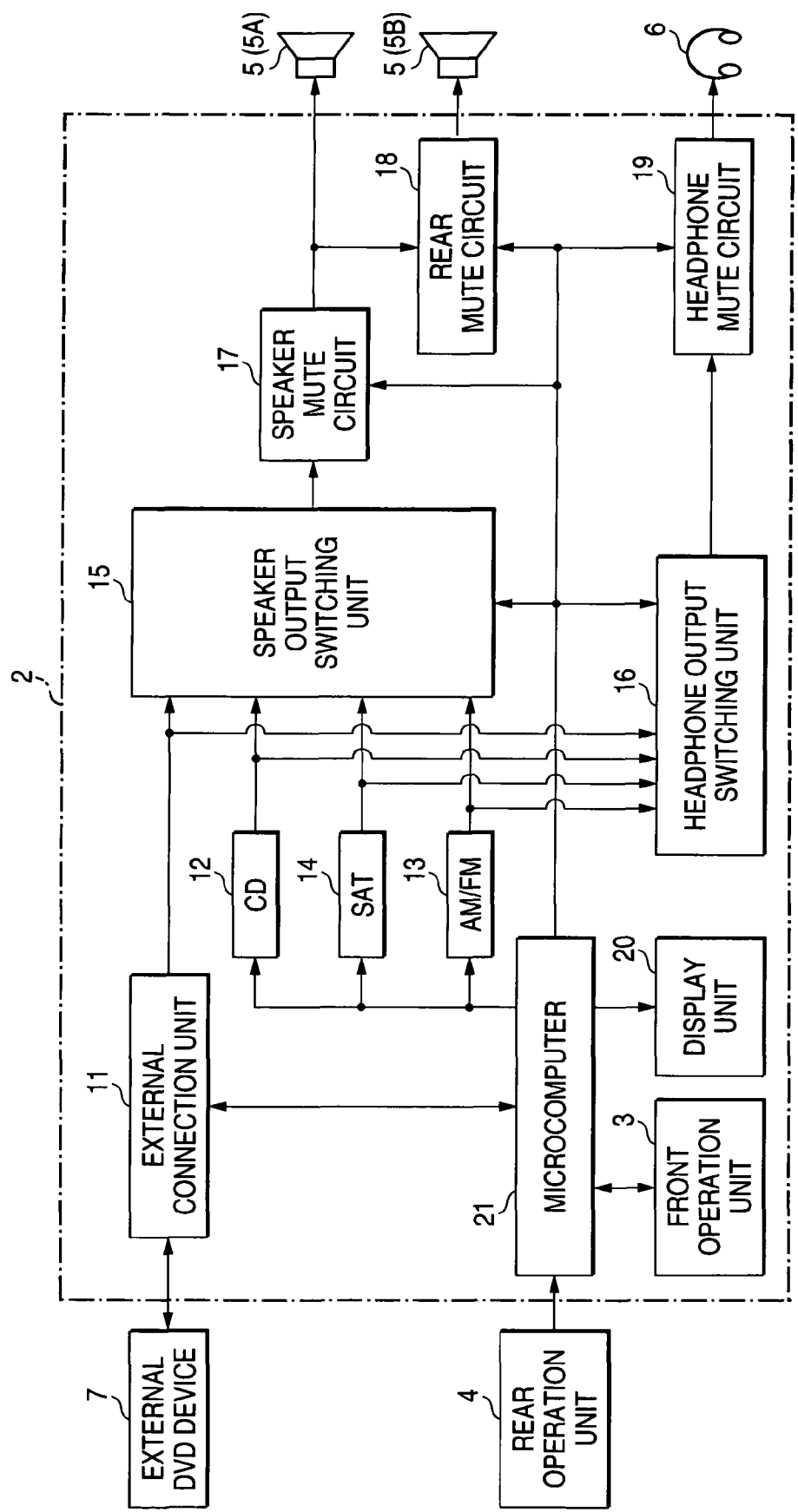
FIG. 2 is a block diagram showing the schematic construction of the inside of the body device according to this embodiment.

FIG. 2 is a block diagram showing the schematic construction of the inside of the body device 2 according to this embodiment.

The body device 2, as shown in FIG. 2, includes: an external connection unit 11 to be connected with the external DVD device 7; a CD play-back unit 12 acting as a plurality of sound sources; an AM/FM radio tuner unit 13 and a satellite radio broadcasting (SAT) tuner unit 14; a speaker output switching unit 15 for selecting/outputting a sound source from those external DVD device 7, CD play-back unit 12, AM/FM radio tuber unit 13 and satellite radio tuber unit 14, to the speaker 5; a headphone output switching unit 16 for selecting/outputting a sound source from the same to the headphone 6; a speaker mute circuit 17 for muting the sound signals from the sound source, as selected by the speaker output switching 15, to the speaker 5; a rear mute circuit 18 for muting the sound signals to the rear speakers 5B; a headphone mute circuit 19 for muting the sound signals from the sound source, as selected by the headphone output switching unit 16, to the headphone 6; a display unit 20 for displaying various pieces of information; and a microcomputer 21 for controlling the body device 2 as a whole.

The body device 2 has dual media functions and can be switched and set to a single mode or a dual mode in response to a predetermined operation from the front operation unit 3 or the rear operation unit 4.

In the single mode, the sound signals from one of the sound based on the sound sources are output exclusively from the speaker 5.

In the dual mode, the sound based on the sound signals from one of the sound sources are output from the speaker 5, whereas the sound based on the sound signals from another sound source are output from the headphone 6.

This dual mode is divided into an ordinary dual mode and a special dual mode. The ordinary dual mode is set in case the dual mode is accepted while the power of the body device 2 is ON. The special dual mode is set when the power of the body device 2 is turned ON in response to a power ON demand signal from the rear operation unit 4 or the external DVD device 7 while the power of the body device 2 is OFF. Here, these ordinary dual mode and special dual mode are not the system setting modes to be separately set, but such a dual mode as is expressed for conveniences of description separately as the ordinary one and the special one in accordance with the setting conditions.

Here, the power ON demand signal from the external DVD device 7 is output in response to the power ON of the external DVD device 7, the disc insertion into the external DVD device 7 or a playing operation of the external DVD device 7, for example. The power ON demand signal from the rear operation unit 4 is output in response to a power ON demand from the rear operation unit 4 to the body device 2.

Figure 3:
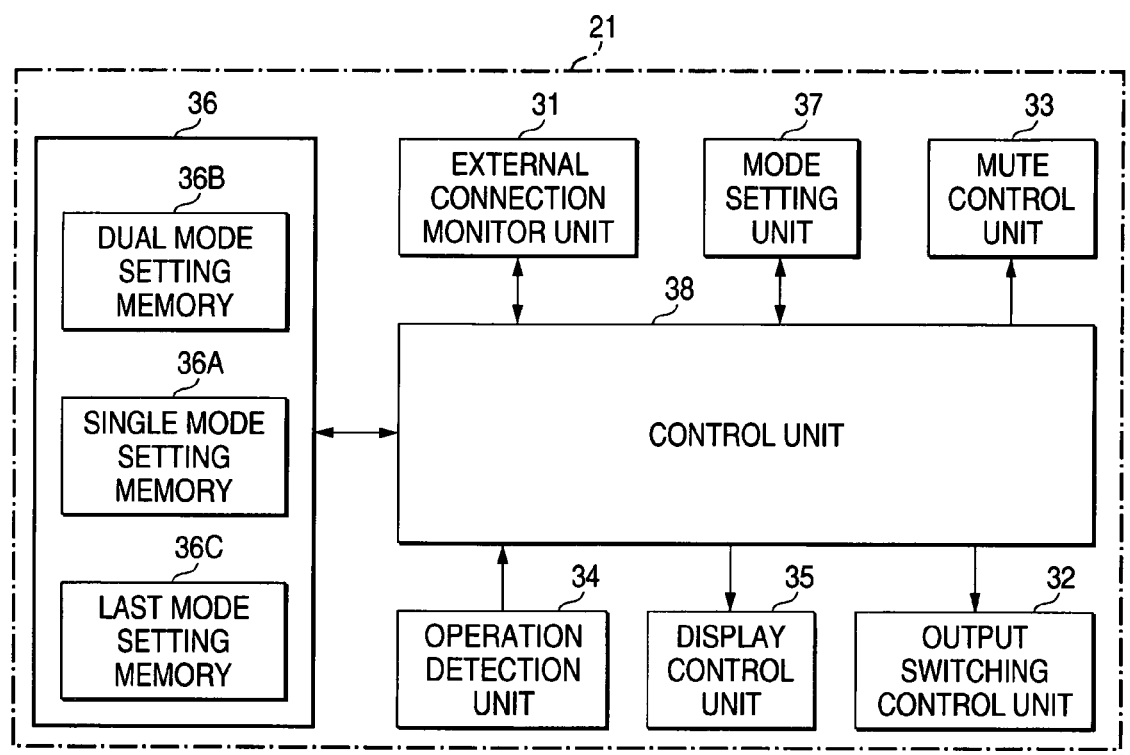
FIG. 3 is a block diagram showing the schematic construction of the inside of a microcomputer of the body device according to this embodiment.

FIG. 3 is a block diagram showing the schematic construction of the inside of the microcomputer 21 of the body device 2 according to this embodiment.

The microcomputer 21, as shown in FIG. 3, includes: an external connection monitor unit 31 for monitoring the external DVD device 7 through the external connection unit 11; an output switching control unit 32 for controlling the speaker output switching unit 15; a mute control unit 33 for controlling the speaker mute circuit 17, the rear mute circuit 18 and the headphone mute circuit 19; an operation detection unit 34 for detecting the input operations from the front operation unit 3 and the rear operation unit 4; a display control unit 35 for controlling the display of the display unit 20; a mode setting storage unit 36 stored with the set contents relating to the operation mode such as the single mode or the dual mode; a mode setting unit 37 for setting the operation mode on the basis of the set contents stored in the mode setting storage unit 36; and a control unit 38 for controlling that microcomputer 21 as a whole.

The mode setting storage unit 36 includes: a single mode setting memory 36A stored with the set contents of the single mode; a dual mode setting memory 36B stored with the set contents of the dual mode; and a last mode setting memory 36C stored with the sound source of the last sound signals for the sound that have been output by the speaker 5 just before the body device 2 was turned OFF, as the last sound source information.

Here, the last mode setting memory 36C stores, when the power of the body device 2 is turned OFF, the sound source information for discriminating the sound source of the last sound signals for the sound that have been output by the speaker 5 just before the power OFF, such as the sound source of the external DVD device 7, the CD play-back unit 12, the AM/FM radio tuner unit 13 or the satellite radio tuner unit 14, as the last sound source information.

In the set contents of the single mode to be stored in the single mode setting memory 36A, only the sound outputs from the front speakers 5A and the rear speakers 5B are made effective, so that the speaker mute circuit 17 and the rear mute circuit 18 are muted OFF whereas the headphone mute circuit 19 is muted ON.

The dual mode setting memory 36B is stored with the set contents relating to the ordinary dual mode and the special dual mode. In the set contents of the ordinary dual mode, the sound outputs from the front speakers 5A and the headphone 6 are different sound sources and are made effective. Therefore: the speaker mute circuit 17 is muted OFF; the rear mute circuit 18 is muted ON; and the headphone mute circuit 19 is muted OFF.

In the set contents of the special dual mode, moreover, the sound outputs from the front speakers 5A and the headphone 6 are different sound sources, and only the sound output from the headphone 6 is made effective, so that the speaker mute circuit 17 and the rear mute circuit 18 are muted ON whereas the headphone mute circuit 19 is muted OFF.

The mode setting unit 37 sets the operation mode on the basis of the set contents of the dual mode setting memory 36B and the single mode setting memory 36A. On the basis of these set contents, moreover, the mute control unit 33 controls the speaker mute circuit 17, the rear mute circuit 18 and the headphone mute circuit 19.

The output switching control unit 32 controls the speaker output switching unit 15 and the headphone output switching unit 16 for selecting/outputting the sound signals from the designated one of the sound sources.

Besides, the acoustic device corresponds to the body device 2; the remote operation unit to the rear operation unit 4; the first output unit to the speaker 5; the second output unit to the headphone 6; the electronic device to the external DVD device 7; the external connection unit to the external connection unit 11; the sound source to the CD play-back unit 12, the AM/FM radio tuner unit 13 and the satellite radio tuner unit 14; the display unit to the display unit 20; the mode setting unit to the mode setting storage unit 36 and the mode setting unit 37; the control unit to the control unit 38; the first mode to the single mode; and the second mode to the dual mode.

Here will be described the actions of the vehicular audio system 1 according to this embodiment.

In case the single mode is set for providing the sound signals from the external DVD device 7, for example, the output switching control unit 32 controls the speaker output switching unit 15 so that the sound signals from the external DVD device 7 may be selected and output.

On the basis of the set contents stored in the single mode setting memory 36A, moreover, the mute control unit 33 mutes OFF the speaker mute circuit 17 and the rear mute circuit 18 but ON the headphone mute circuit 19.

Here in the body device 2, the sound based on the voice signals from the external DVD device 7 are output only from the front speakers 5A and the rear speakers 5B but not from the headphone 6.

In case there is set the ordinary dual mode, in which the sound signals from the external DVD device 7 are provided for the rear passenger and in which the sound signals from the CD play-back unit 12 are provided for the front passenger, on the other hand, the output switching control unit 32 controls the speaker output switching unit 15 so that the sound signals from the CD play-back unit 12 may be selected and output, and the headphone output switching unit 16 so that the sound signals from the external DVD device 7 may be selected and output.

On the basis of the set contents of the ordinary dual mode stored in the dual mode setting memory 36B, moreover, the mute control unit 33 mutes OFF the speaker mute circuit 17, ON the rear mute circuit 18 and OFF the headphone mute circuit 19.

In other words, the body device 2 can output the sound based on the sound signals from the CD play-back unit 12 not from the rear speakers 5B but from only the front speakers 5A, and can output the sound based on the voice signals from the external DVD device 7 from the headphone 6.

In case there is set the special dual mode, in which the sound signals from the external DVD device 7 are provided for the rear passenger, on the other hand, the output switching control unit 32 selects the sound source on the basis of the last sound source information stored in the last mode setting memory 36C, and controls the speaker output switching unit 15 so that the sound signals from that sound source may be selected and output. At the same time, the output switching control unit 32 controls the headphone output switching unit 16 so that the sound signals from the external DVD device 7 may be selected and output.

On the basis of the set contents of the special dual mode stored in the dual mode setting memory 36B, moreover, the mute control unit 33 mutes ON the speaker mute circuit 17 and the rear mute circuit 18 and OFF the headphone mute circuit 19.

In other words, the body device 2 can output the sound based on the sound signals from the external DVD device 7 not from the front speakers 5A and the rear speakers 5B but from only the headphone 6.

Figure 4:
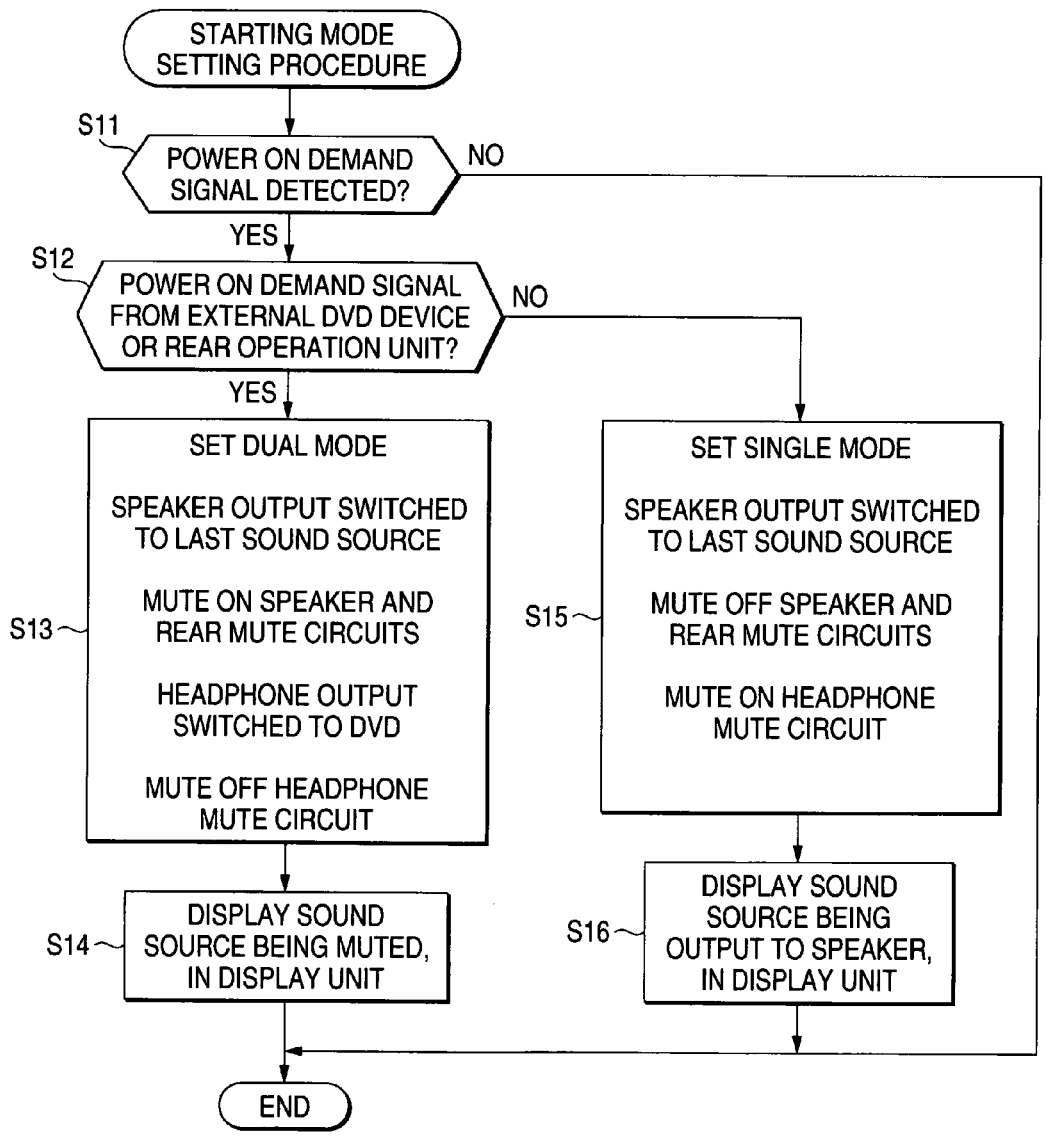
FIG. 4 is a flow chart showing the processing actions of the microcomputer to participate in the starting mode setting procedure of the body device according to this embodiment.
Figure 5:
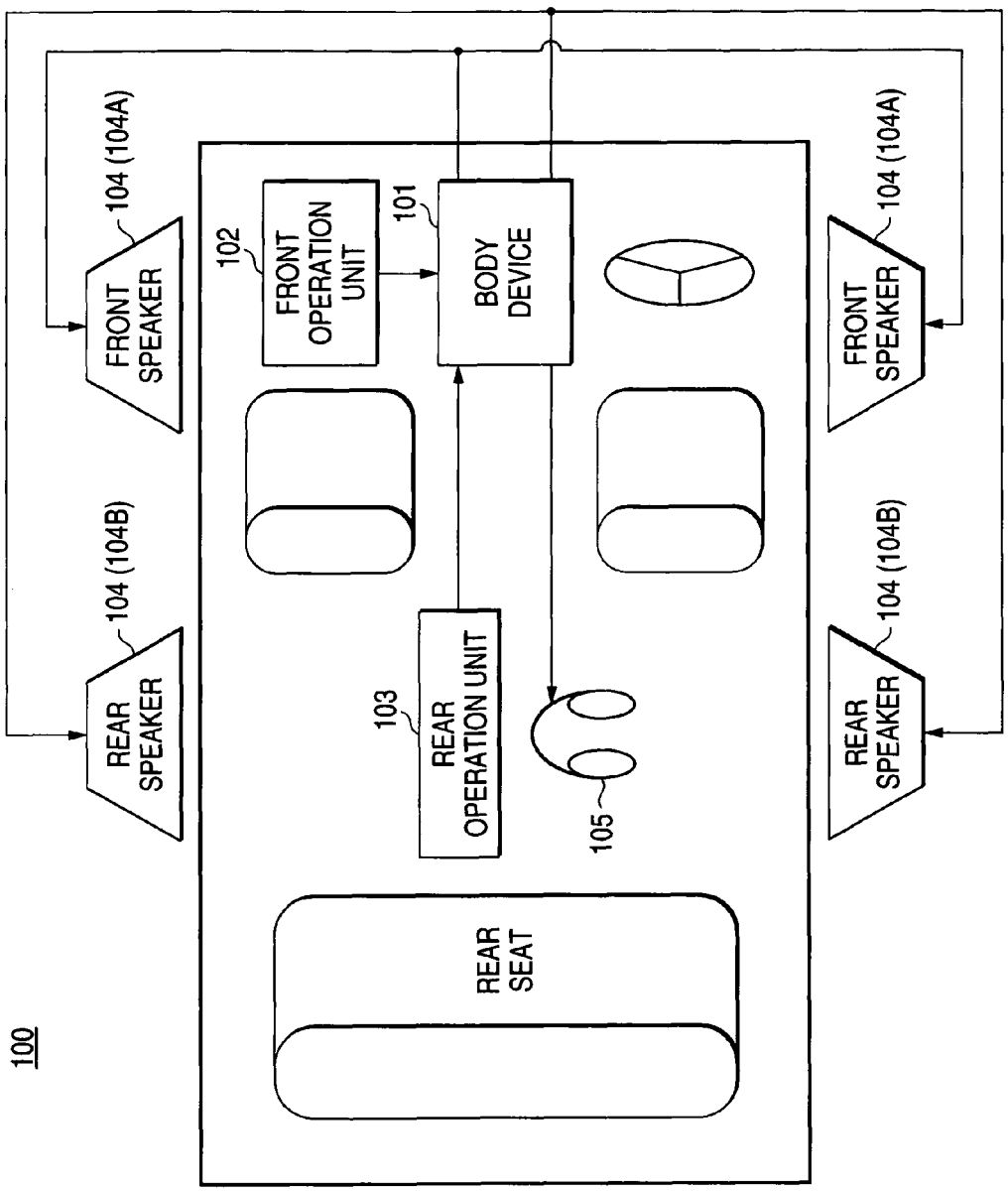
FIG. 5 is a system construction diagram showing the entire construction of a vehicular audio system having a general dual media function.

Here will be described the starting mode setting procedure of the body device 2. FIG. 4 is a flow chart showing the processing actions of the microcomputer 21 to participate in the starting mode setting procedure of the body device 2.

In the starting mode setting procedure shown in FIG. 4, when a power ON demand signal is detected, the power of the body device 2 is turned ON in the single mode or the dual mode in accordance with the kind of the power ON demand signal.

In FIG. 4, the control unit 38 of the microcomputer 21 decides (at Step S11) whether or not the power ON demand signal has been detected. Here, the power ON demand signal is one for demanding the power ON of the body device 2.

If the power ON demand signal is detected, the control unit 38 decides (at Step S12) whether or not the power ON demand signal is the signal from the external DVD device 7 or the rear operation unit 4. Here, the power ON demand signal from the external DVD device 7 is the signal, which is output in response to the power ON of the external DVD device 7, the disk insertion of the external DVD device 7 or the playing operation of the external DVD device 7, and the power ON demand signal from the rear operation unit 4 is the signal, which is output in response to the power ON demand from the rear operation unit 4 to the body device 2.

If it is decided that the power ON demand signal comes from the external DVD device 7 or the rear operation unit 4, the control unit 38 sets the special dual mode (at Step S13) on the basis of the set contents stored in the dual mode setting memory 36B.

In case the special dual mode is to be set in response to the power ON demand signal from the external DVD device 7, for example, the output switching control unit 32 selects the last sound source on the basis of the last sound source information stored in the last mode setting memory 36C, and controls the speaker output switching unit 15 so that the sound signals from that sound source may be selected and output, and the headphone output switching unit 16 so that the sound signals from the external DVD device 7 may be selected and output.

On the basis of the set contents of the special dual mode stored in the dual mode setting memory 36B, moreover, the mute control unit 33 mutes ON the speaker mute circuit 17 and the rear mute circuit 18 and OFF the headphone mute circuit 19.

In short, the body device 2 turns ON the power source in the special dual mode so that the sound based on the sound signals from the external DVD device 7 are output from only the headphone 6 without any sound output from the front speakers 5A and the rear speakers 5B.

In case the special dual mode is set at Step S13 in response to the power ON demand signal from the rear operation unit 4, on the other hand, the output switching control unit 32 selects the last sound source on the basis of the last sound source information stored in the last mode setting memory 36C, and controls the speaker output switching unit 15 so that the sound signals from that sound source may be selected and output, and the headphone output switching unit 16 so that the sound signals from the sound source designated at the rear operation unit 4 may be selected and output.

On the basis of the set contents of the special dual mode stored in the dual mode setting memory 36B, moreover, the mute control unit 33 mutes ON the speaker mute circuit 17 and the rear mute circuit 18 and OFF the headphone mute circuit 19.

In short, the body device 2 turns ON the power source in the special dual mode so that the sound based on the sound signals from the sound source designated at the rear operation unit 4 are output from the headphone 6 without any sound output from the front speakers 5A and the rear speakers 5B.

When the special dual mode is set at Step S13, the sound based on the sound signals are output not from the front speakers 5A and the rear speakers 5B but from only the headphone 6. Therefore, the display control unit 35 of the microcomputer 21 displays the sound source information being muted but to be output by the front speakers 5A, in the display unit 20 (at Step S14), and ends these processing actions. On the basis of the displayed contents of the display unit 20, the front passenger can recognize it visually that the power is turned ON and muted.

If it is decided at Step S12 that the power ON demand signal does not come from the external DVD device 7 or the rear operation unit 4, the control unit 38 of the microcomputer 21 sets the single mode (at Step S15) on the basis of the set contents stored in the single mode setting memory 36A.

In case the single mode is to be set, the output switching control unit 32 selects the last sound source on the basis of the last sound source information stored in the last mode setting memory 36C, and controls the speaker output switching unit 15 so that the sound signals from that sound source may be selected and output.

On the basis of the set contents stored in the single mode setting memory 36C, moreover, the mute control unit 33 mutes OFF the speaker mute circuit 17 and the rear mute circuit 18 and ON the headphone mute circuit 19.

In short, the body device 2 outputs the sound based on the sound signals from only the front speakers 5A and the rear speakers 5B but not from the headphone 6.

When the single dual mode is set at Step S15, the sound based on the sound signals are output not from the headphone 6 but from only the front speakers 5A and the rear speakers 5B. Therefore, the display control unit 35 of the microcomputer 21 displays the sound source information relating to the sound source being output to the speakers, in the display unit 20 (at Step S16), and ends these processing actions.

According to the starting mode setting procedure shown in FIG. 4, the power source is turned ON in the single mode when the power ON demand signal from the front operation unit 3 is detected while the power of the body device 2 is OFF, and the power source is turned ON in the dual mode when the power ON demand signal from the rear operation unit 4 or the external DVD device 7 is detected while the power of the body device 2 is OFF. Even from the rear operation unit 4 or the external DVD device 7 arranged on the rear side in the compartment, therefore, the power source can be turned ON in the special dual mode without burdening the front passenger with the operations.

When the power ON demand signal from the rear operation unit 4 or the external DVD device 7 is detected while the power source of the body device 2 is OFF, according to this embodiment, the power source is turned ON in the special dual mode. Even from the rear operation unit 4 or the external DVD device 7 arranged on the rear side in the compartment, therefore, the power source can be turned ON in the special dual mode without burdening the operations of the front passenger.

When the power ON demand signal to be output from the external DVD device 7 is detected as the power source of the external DVD device 7 is turned ON, according to this embodiment, the power source is turned ON in the special dual mode. In response to the external DVD device 7 arranged on the rear side, therefore, the power source of the body device 2 can be turned ON in the special dual mode without burdening the operations of the front passenger.

When the power ON demand signal to be output from the external DVD device 7 is detected as the disk is inserted into the external DVD device 7, according to this embodiment, the power source is turned ON in the special dual mode. In response to the insertion of the disk into the external DVD device 7 arranged on the rear side, therefore, the power source of the body device 2 can be turned ON in the special dual mode without burdening the operations of the front passenger.

When the power source of the body device 2 is turned ON in the special dual mode while it is OFF, according to this embodiment, the sound outputs of the front speakers 5A and the rear speakers 5B are interrupted. Even when the rear passenger turns ON the power source of the body device 2 in the special dual mode, therefore, it is possible to reliably prevent the situation, in which the front passenger might otherwise be threatened by a sudden speaker output.

When the power source is turned ON in the special dual mode while the power source of the body device 2 is OFF, according to this embodiment, the muted sound source information to be output by the front speakers 5A is displayed in the display unit 20. Even when the rear passenger turns ON the power source of the body device 2 in the special dual mode, therefore, the front passenger can recognize it visually on the basis of the displayed contents of the display unit 20 that the power source is ON.

When the power ON demand signal from the remote operation unit is detected while the power source of the acoustic device is OFF, according to the acoustic device of the invention thus constructed, the power source is turned ON in the second mode such as the dual mode. Even from the remote operation unit arranged on the rear side in the compartment, therefore, the power source can be turned ON in the dual mode without burdening the operations of the front passenger.

When the power ON demand signal from the remote operation unit of an electronic device connected with the outside is detected while the power source of the acoustic device of the invention is OFF, according to the acoustic device, the power source is turned ON in the second mode. In the case of the connection with the electronic device arranged on the rear side in the compartment, therefore, the power source can be turned ON in the dual mode even from that electronic device arranged on the rear side, without burdening the operations of the front passenger.

When the electronic device is connected with the outside so that the power ON demand signal from the electronic device while the power source of the acoustic device is OFF, according to the acoustic device of the invention, the power source is turned ON in the second mode such as the dual mode. In the case of the connection with the electronic device arranged on the rear side in the compartment, therefore, the power source can be turned ON in the dual mode even from that electronic device arranged on the rear side, without burdening the operations of the front passenger.

According to the acoustic device of the invention, the signal to be output from the electronic device in response to the power ON of the electronic device is used as the power ON demand signal. In response to the power ON of the electronic device arranged on the rear side, therefore, the power source of the acoustic device can be turned ON in the dual mode without burdening the operations of the front passenger.

According to the acoustic device of the invention, the signal to be output from the electronic device in response to the insertion of a recording medium such as a play-back disk into the electronic device is used as the power ON demand signal. In response to the insertion of the recording medium into the electronic device arranged on the rear side, therefore, the power source of the acoustic device can be turned ON in the dual mode without burdening the operations of the front passenger.

When the power source of the acoustic device is turned ON in the second mode such as the dual mode while it is OFF, according to acoustic device of the invention, the sound outputs of the first output unit such as the speakers are interrupted. Even when the rear passenger turns ON the power source in the dual mode, therefore, it is possible to reliably prevent the situation, in which the front passenger might otherwise be threatened by a sudden speaker output. However, the aforementioned interrupted state of the sound output can be released by the operations of the front operation unit.

When the power source of the acoustic device of the invention is turned ON in the second mode such as the dual mode while it is OFF, according to the acoustic device of the invention, there is displayed in the display unit not only the power ON information indicating that the power source is turned ON but also that the sound output is being interrupted (or muted). Even when the rear passenger turns ON the power source in the dual mode, therefore, the front passenger can recognize it visually on the basis of the displayed contents of the display unit that the power source is ON.

When the power source of the acoustic device of the invention is turned ON in the second mode such as the dual mode while it is OFF, according to the acoustic device of the invention, the last sound source information being stored in the last information storage unit is displayed as the power ON information in the display unit. Even when the rear passenger turns ON the power source in the dual mode, therefore, the front passenger can recognize it visually on the basis of the displayed contents of the display unit that the power source is ON.

What is claimed is:

1. An acoustic device comprising:
   a plurality of sound sources;
   a first output unit for outputting sound based on sound signals from the sound sources, the first output unit comprising front speakers;
   a first operation unit which is capable of turning on a power supply to the acoustic device;
   a second output unit for outputting sound based on sound signals from the sound sources;
   a second operation unit which is capable of turning on the power supply to the acoustic device;
   a mode setting unit setting either one of
      a first mode, in which the sound based on the sound signals from one of the sound sources are output from the first output unit, and
      a second mode, in which while the sound based on the sound signals from one of the sound sources are being output from the first output unit, the sound based on the sound signals from another sound source are output from the second output unit; and
   a control unit for
      controlling the mode setting unit to set the first mode or the second mode when the power supply to the acoustic device is turned on by the first operation unit and controlling the mode setting unit to set the second mode and controlling the front speakers of the first output unit to be in a muted state when the power supply to the acoustic device is turned on by the second operation unit.

2. An acoustic device according to claim 1, further comprising:
   a remote operation unit for operating the acoustic device remotely; and
   an external connection unit for externally connecting an electronic device having the remote operation unit,
   wherein the control unit includes a control unit for controlling the mode setting unit to turn ON the power source of the acoustic device in the second mode, when the control unit detects the power ON demand signal from the remote operation unit through the external connection unit while the power source is OFF.

3. An acoustic device according to claim 2,
   wherein the power ON demand signal obtained through the external connection unit is output from the electronic device in response to the power ON of the electronic device.

4. An acoustic device according to claim 2,
   wherein the power ON demand signal obtained through the external connection unit is output from the electronic device in response to the insertion of a recording medium into the electronic device.

5. An acoustic device according to claim 1,
   wherein the control unit causes a display, unit to display power ON information indicating that the power source is turned ON, when the power source of the acoustic device is turned ON in the second mode while the power source is OFF.

6. An acoustic device according to claim 5, further comprising:
   a last information storage unit for storing, when the power source of the acoustic device is turned OFF, the sound source information relating to the sound source of the sound based on the sound signals being output by the first output unit just before the OFF of the power source, as last sound source information,
   wherein the control unit causes the display unit to display the last sound source information stored in the last information storage unit, as the power ON information, when the power source is turned ON in the second mode while the power source is OFF.

7. The acoustic device according to claim 1, wherein the interrupted state is releasable by the control unit.

8. The acoustic device according to claim 1, wherein the first output unit includes a first speaker and a second speaker, wherein the second mode includes:
   a first sub-mode, in which the second speaker of the first output unit is in a muted state and the first speaker is in an output state; and
   a second sub-mode, in which the first speaker and the second speaker of the first output unit are in a muted state, and
   wherein the control unit controls the mode setting unit to set the second sub-mode of the second mode when the power supply to the acoustic device is turned on by the second operation unit.

9. An acoustic device comprising:
   a plurality of sound sources;
   a first output unit for outputting sound based on sound signals from the sound sources, the first output unit comprising front speakers;
   an operation unit which is capable of turning on a power supply to the acoustic device;
   a second output unit for outputting sound based on sound signals from the sound sources,
   a mode setting unit setting either one of
      a first mode, in which the sound based on the sound signals from one of the sound sources are output from the first output unit, and
      a second mode, in which while the sound based on the sound signals from one of the sound sources are being output from the first output unit, the sound signals from another sound source are output from the second output unit;
   an external connection unit for externally connecting an electronic device which is capable of turning on a power supply to the acoustic device; and
   a control unit for
      controlling the mode setting unit to set the first mode or the second mode when the power supply to the acoustic device is turned on by the operation unit and
      controlling the mode setting unit to set the second mode and controlling the front speakers of the first output unit to be in a muted state when the power supply to the acoustic device is turned on by the electronic device.

10. An acoustic device according to claim 9,
    wherein the power ON demand signal obtained through the external connection unit is output from the electronic device in response to the power ON of the electronic device.

11. An acoustic device according to claim 9,
    wherein the power ON demand signal obtained through the external connection unit is output from the electronic device in response to the insertion of a recording medium into the electronic device.

12. An acoustic device according to claim 9,
    wherein the control unit causes a display unit to display power ON information indicating that the power source is turned ON, when the power source of the acoustic device is turned ON in the second mode while the power source is OFF.

13. An acoustic device according to claim 12, further comprising:
    a last information storage unit for storing, when the power source of the acoustic device is turned OFF, the sound source information relating to the sound source of the sound based on the sound signals being output by the first output unit just before the OFF of the power source, as last sound source information,
    wherein the control unit causes the display unit to display the last sound source information stored in the last information storage unit, as the power ON information, when the power source is turned ON in the second mode while the power source is OFF.

* * * * *